United States Patent

Tanii et al.

[11] Patent Number: 5,991,553
[45] Date of Patent: Nov. 23, 1999

[54] MECHANISM FOR PREVENTING REVERSAL OF ROTATION

[75] Inventors: Junichi Tanii, Izumi; Yoshiharu Tanaka, Kawachinagano, both of Japan

[73] Assignee: Minolta Co., Ltd., Osaka, Japan

[21] Appl. No.: 09/084,351

[22] Filed: May 27, 1998

[30] Foreign Application Priority Data

May 28, 1997 [JP] Japan .................................. 9-138888

[51] Int. Cl.$^6$ .................................................. G03B 17/24
[52] U.S. Cl. ........................................... 396/396; 396/440
[58] Field of Search .................................. 396/395, 396, 396/411, 440

[56] References Cited

U.S. PATENT DOCUMENTS 3,938,753  2/1976  Oshima .................................. 396/440
4,949,111  8/1990  Alligood .
5,765,065  6/1998  Yoshida et al. ........................ 396/396

FOREIGN PATENT DOCUMENTS 7-45069  10/1995  Japan .

*Primary Examiner*—David M. Gray
*Attorney, Agent, or Firm*—McDermott, Will & Emery

[57] ABSTRACT

In a ring-shaped resilient member, a multiplicity of protrusions inwardly extending from the inner radius are arranged substantially isometrically about the center. When a fork is rotating leftward, the protrusions extending from the resilient member fixed to the inner wall of a housing are bent in the rotation direction of the fork, so that the load imposed on the fork by the protrusions as a frictional force is light. When the rotation direction of the fork is reversed from the leftward direction to the rightward direction, the direction in which the protrusions are swung is also reversed, so that a load is imposed at this time to prevent reversal of rotation of the cartridge spool.

15 Claims, 13 Drawing Sheets

MECHANISM FOR PREVENTING REVERSAL OF ROTATION

This application is based on application No. H9-138888 filed in Japan, the contents of which is hereby incorporated by reference.

BACKGROUND OF THE INVENTION

1. Field of the Invention

The present invention relates to a mechanism for preventing reversal of rotation of a moving member which moves in both the normal and reverse directions, and more specifically, to a mechanism for preventing reversal of rotation of a film cartridge spool of a camera based on the advanced photo system (APS).

2. Description of the Prior Art

Generally, a ratchet mechanism is used for prevention of reversal of rotation and positioning of a moving member which moves in one direction. However, in the ratchet mechanism, since engagement by ratchet teeth occurs every interval between ratchet teeth, it is impossible to stop a moving member at a given position and it is also impossible to easily stop at a predetermined position a moving member which is moving or rotating in both the normal and reverse directions.

For example, in an APS camera, the film cartridge is provided with a function to indicate whether the film loaded in the film cartridge is unused, exposed partway, exposed to the end or developed. The so-called use condition mark is called a visual exposure indicator (VEI) and the use condition is indicated by stopping the cartridge spool at a specific rotation stop position. Therefore, in an APS camera, it is necessary for the rotation stop position of the cartridge spool to be different, for example, between when the film is rewound after exposed to the end and when the film is rewound after exposed partway.

The film cartridge of an APS camera is provided with a cartridge door, namely a light lock door (LLD). By closing the LLD, shielding of the film exit is performed and the cartridge spool is engaged, and by opening the LLD, the film exit is opened and the cartridge spool is disengaged. However, since the cartridge spool is not engaged from when the cartridge spool is stopped at a predetermined rotation stop position after the film is rewound to when the cartridge door is closed, there is a possibility that the cartridge spool is rotated. When this happens, an erroneous indication is provided such that a film which is exposed only partway is regarded as exposed to the end.

Moreover, since back tension is applied to the film when the film is rewound, the film is tightly wound in the cartridge spool. In an APS camera, since it is necessary to load the film after pushing the film out of the film cartridge, the film is made firm, so that the film in the film cartridge after being rewound is like a so-called spiral spring. If the cartridge spool is disengaged under this state, it is rotated in a direction opposite to the rewinding direction because of the resilience of the film.

Improvements have been made to solve this problem. An example of the improvements is such that a frictional force in the direction of axial rotation is always imposed by an O ring and the like made of a resilient material such as rubber on a camera-body-side fork engaged with the cartridge spool for performing loading, winding and rewinding of the film wound around the cartridge spool. With this arrangement, the fork does not idle even after the rotation drive force transmitted to the fork is stopped, so that erroneous rotation of the cartridge spool is prevented.

Another example is such that a fork gear for transmitting a rotation drive force to the fork is engaged with a lever. Specifically, as shown in FIG. 18, the lower end of a longitudinally elongated lever 31 is engaged with a fork gear 30 which moves in conjunction with a non-illustrated fork, and an elongate hole 31a is provided in the lever 31 along the length so as to be rotatably and slidably engaged with a pin 32 provided on the camera body side.

A coil portion of a torsion coil spring 36 is engaged with a pin 34 provided on the body side, one arm portion of the spring 36 is fixed to a pin 35 and the other arm portion pushes by a spring force a pin 33 provided at the upper end of the lever 31 in the direction of the arrow, so that the lever 31 is pressed against the fork gear 30 to impose a load thereon.

At this time, when the fork gear is continuously rotating leftward in the figure, the lever 31 is swung leftward as shown by the broken line of the figure, so that one side surface thereof slides over the tips of the teeth of the fork gear 30. When the rotation direction of the fork gear 30 is reversed from the leftward direction to the rightward direction, the lever 31 is once engaged with the fork gear 30 as shown by the solid line of the figure, pushed out rightward by further rotation, and swung rightward as shown by the dash and dotted line of the figure, so that the other side surface of the lever 31 slides over the tips of the teeth of the fork gear 30.

However, in the above-described structure in which a frictional force is always applied in the direction of axial rotation of the fork, it sometimes occurs during the rewinding of the film by the spool on the camera side that the film is momentarily wound very tightly around the cartridge spool to change the rewinding speed for an instant. When the film is rewound, information on photographing and the like is magnetically recorded on the film. However, if the rewinding speed changes, the magnetic signals become nonuniform, so that intended information cannot be recorded.

In the above-described structure in which the lever is engaged with the fork gear, a load is generated when the lever is pushed out by the fork gear; however, since the fork gear and the lever are not always engaged with each other at the moment of reversal of the rotation, no load is generated and the fork idles at that time, so that there is a possibility that the cartridge spool rotates erroneously. Moreover, a sound of collision between the lever and the fork gear is generated when the fork gear is driven. This is unpleasant and causes wear of the lever and the fork gear.

SUMMARY OF THE INVENTION

An object of the present invention is to provide a mechanism for preventing reversal of rotation in which, with a simple structure, erroneous rotation of the cartridge spool is prevented and the load imposed when the film is transported is light.

To achieve the above-mentioned object, according to the present invention, in a mechanism for preventing reversal of rotation which is used for a camera performing photographing by loading in a cartridge chamber a film cartridge having a cartridge spool and a film wound around the cartridge spool, and that prevents reversal of rotation of the cartridge spool, the following are provided: a fork engaged with the cartridge spool in the cartridge chamber; and a resilient member fixed to the body side of the camera around the fork and having a protrusion inwardly extending to abut the periphery of the fork. The protrusion slides while being bent along the rotation of the fork in one direction and when the rotation direction of the fork is reversed to another direction, the direction of bend of the protrusion is also reversed to thereby impose a load at the time of reversal of rotation on the fork.

Moreover, according to another structure, the following are provided: a fork engaged with the cartridge spool in the cartridge chamber; and a resilient member fixed to the fork and having a protrusion outwardly extending to abut a housing provided on the body side of the camera around the fork. The protrusion slides while being bent along the rotation of the fork in one direction and when the rotation direction of the fork is reversed to the other direction, the direction of bend of the protrusion is also reversed to thereby impose a load at the time of reversal of rotation on the fork.

Further, in the above-described structures, the end of the protrusion may be previously bent along the rotation of the fork in one direction so that the load imposed when the rotation direction of the fork is reversed from one direction to the other direction is heavier than the load imposed when the rotation direction of the fork is reversed from the other direction to one direction.

As another structure, in a mechanism for preventing reversal of rotation which is used for a camera performing photographing by loading in a cartridge chamber a film cartridge having a cartridge spool and a film wound around the cartridge spool, and that prevents reversal of rotation of the cartridge spool, the following are provided: a fork engaged with the cartridge spool in the cartridge chamber; and a lever inwardly spring-pushed from around the fork to abut the periphery of the fork. The lever slides while being inclined along the rotation of the fork in one direction and when the rotation direction of the fork is reversed to the other direction, the direction of inclination of the lever is also reversed to thereby impose a load at the time of reversal of rotation on the fork.

Further, according to another structure, the following are provided: a rotating member which is rotatable in both directions; and a resilient member disposed adjacent to the rotating member and having a protrusion which is frictionally in contact with the peripheral surface of the rotating member. The protrusion slides while being bent along the rotation of the rotating member in one direction and when the rotation direction of the rotating member is reversed to the other direction, the direction of bend of the protrusion is also reversed to thereby impose a load at the time of reversal of rotation on the rotating member.

In a mechanism for preventing reversal of rotation which is used for a camera having a spool for rewinding a film sent out of a film cartridge loaded in a cartridge chamber, a resilient member is provided fixed to the camera body around the spool and having a protrusion which is frictionally in contact with the spool. The protrusion slides while being bent along the rotation of the spool in one direction and when the rotation direction of the spool is reversed to the other direction, the direction of bend of the protrusion is also reversed to thereby impose a load at the time of reversal of rotation on the spool.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1A:
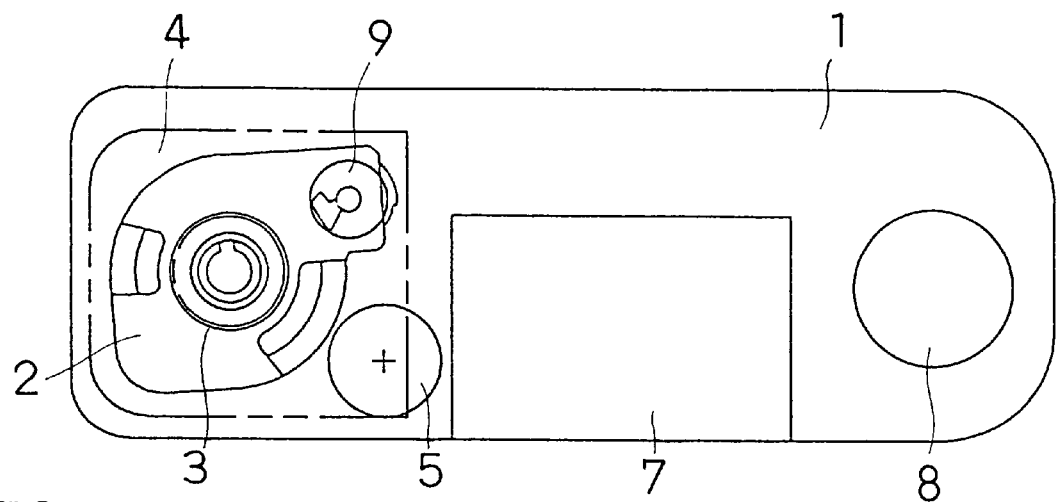
FIGS. 1A and 1B are views schematically showing the disposition of principal parts of a camera according to the present invention.
Figure 1B:
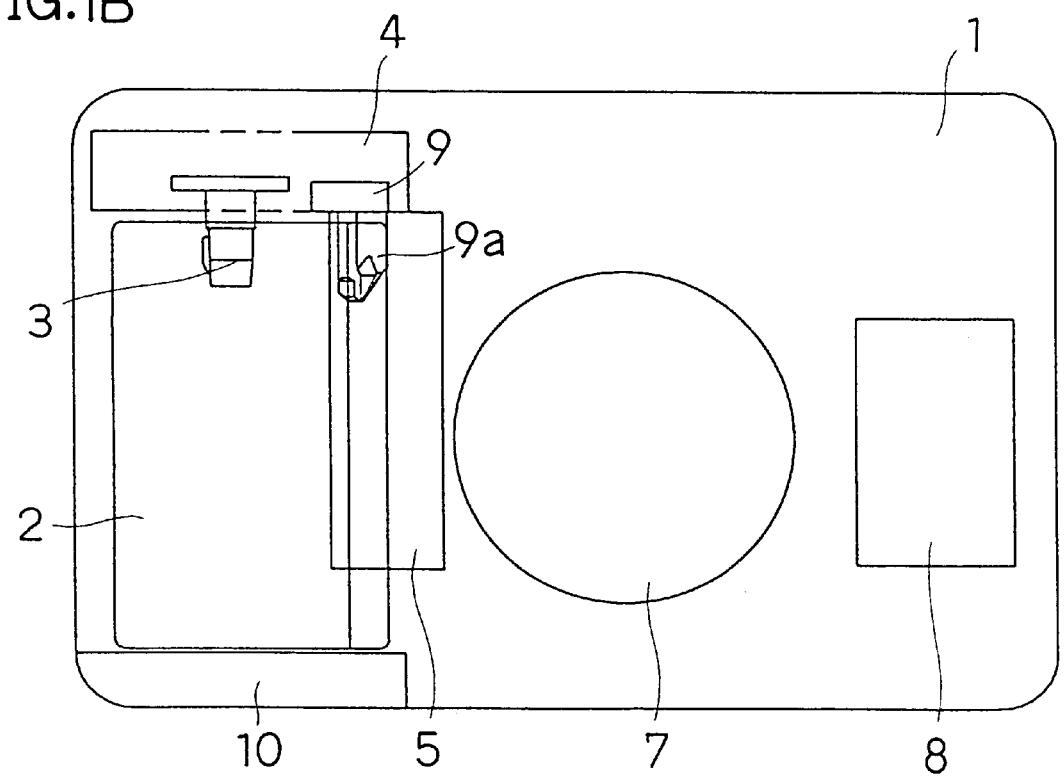

Hereinafter, preferred embodiments of the present invention will be described with reference to the drawings. FIGS. 1A and 1B are views schematically showing the disposition of principal parts of an example of a camera according to the present invention. FIG. 1A is a plan view. FIG. 1B is a front view. In the figures, reference numeral 1 represents a camera body, reference numeral 2 represents a film cartridge loaded in a non-illustrated cartridge chamber of the camera, reference numeral 3 represents a fork engaged with a non-illustrated cartridge spool of the film cartridge 2 and performing loading, winding and rewinding of the film wound around the cartridge spool, reference numeral 4 represents a drive switching unit for switching among operations, and reference numeral 5 represents a motor for supplying a drive force for each operation.

Reference numeral 7 represents a barrel for a lens for photographing. Reference numeral 8 represents a rewinding spool for rewinding the film in a direction that the film is drawn out. Reference numeral 9 represents an LLD driver which is a component of a non-illustrated door opening and closing unit and engaged with an LLD for opening and closing the LLD. Reference numeral 9a represents a door driver key which is an actual engagement portion of the LLD driver 9 and formed integrally with the LLD driver 9. Reference numeral 10 represents a cartridge chamber lid. The non-illustrated door opening and closing unit is disposed in the drive switching unit 4 and performs driving for opening and closing the non-illustrated LLD of the film cartridge 2. In this structure, the driving of the door opening and closing unit is performed by rotation of the motor 5 in one direction.

Other operations such as loading, winding and rewinding of the film and unlocking of the cartridge chamber lid 10 are also performed by rotation of the motor 5 in one direction. Switching thereamong is performed by non-illustrated planet gears, cranks and cams in the drive switching unit 4.

Figure 15:
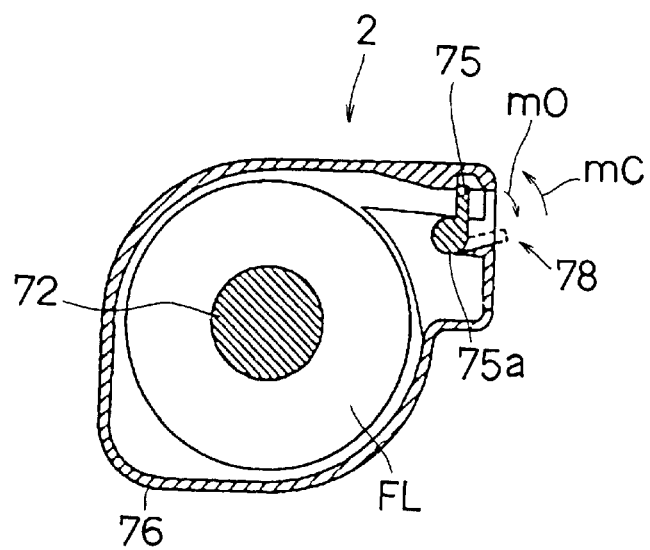
FIG. 15 is a lateral cross-sectional view of a film cartridge.

The film cartridge 2 will be described. FIG. 15 is a lateral cross-sectional view of the film cartridge 2 usable in a camera employing the embodiment of the present invention. As shown in the figure, the film cartridge 2 has a hard shell structure comprising a plastic-made cartridge case 76. In the cartridge case 76 are disposed a cartridge spool 72 and a cartridge door (LLD) 75 for intercepting light from a film FL wound around the cartridge spool 72 at a film exit 78.

The cartridge door 75 is held by the cartridge case 76 at a non-illustrated door engagement portion provided at each end of an axial portion 75a of the cartridge door 75, and is pivotable about the axial portion 75a within a predetermined angle range in directions of arrows mO and mC. To open or close the cartridge door 75, the door driver key 9a is engaged in a non-illustrated key groove provided at the door engagement portion and the LLD driver 9 is rotated. The broken line in the figure shows the position of the cartridge door 75 in opened state.

Figure 16:
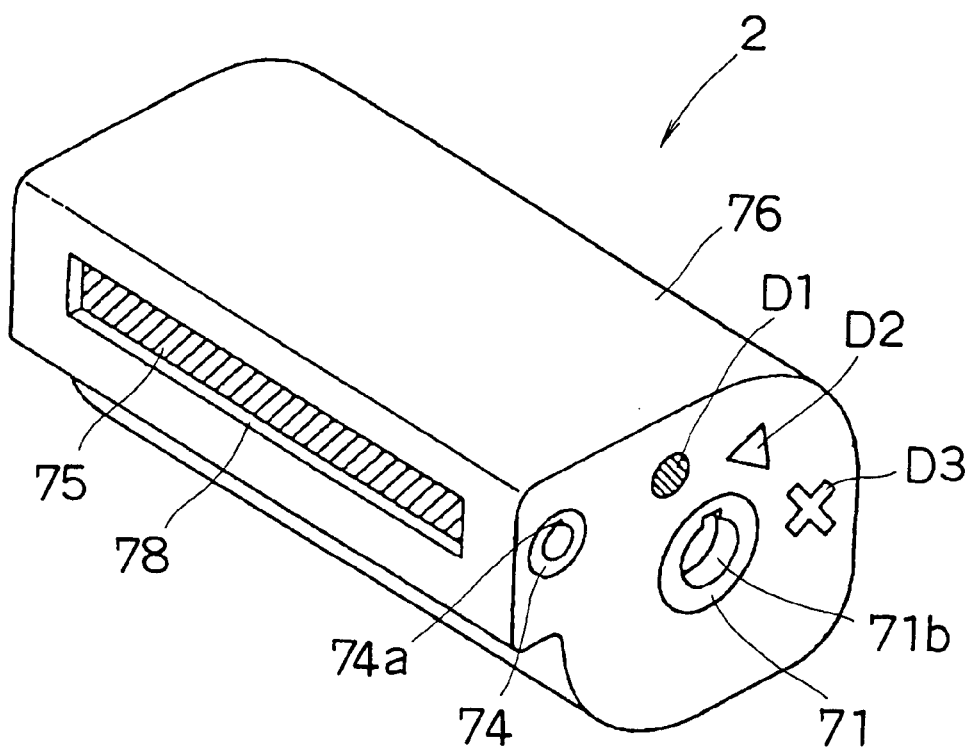
FIG. 16 is an external perspective view of the film cartridge.

As shown in FIG. 16, a spool engagement portion 71 is integrally formed at each end of the cartridge spool 72. In order that the rotation stop position of the cartridge spool 72 can be controlled by a non-illustrated control circuit of the camera, the cross-sectional configuration of the spool engagement portion 71 is of rotation asymmetry. The spool engagement portions 71 provided at the ends of the cartridge spool 72 have the same configuration in order to increase the degree of freedom of the film cartridge 2 when the film cartridge 2 is assembled.

A non-illustrated display disk provided at one end of the cartridge spool 72 on the side of display windows D1 to D3 is partially colored at a predetermined position on the disk surface. At a display disk side end of the cartridge case 76, the display window D1 for indicating that the film is unused, the display window D2 for indicating that the film is exposed partway and the display window D3 for indicating that the film is exposed to the end are formed as mentioned above. A display window for indicating that the film is developed is sometimes added. Since the fork 3 controls the rotation stop position of the cartridge spool 72 so as to correspond to the use condition of the film cartridge 2 after the completion of the film rewinding, the use condition of the film cartridge 2 can be confirmed according to which of the display windows D1 to D3 the colored portion is seen through.

Figure 17A:
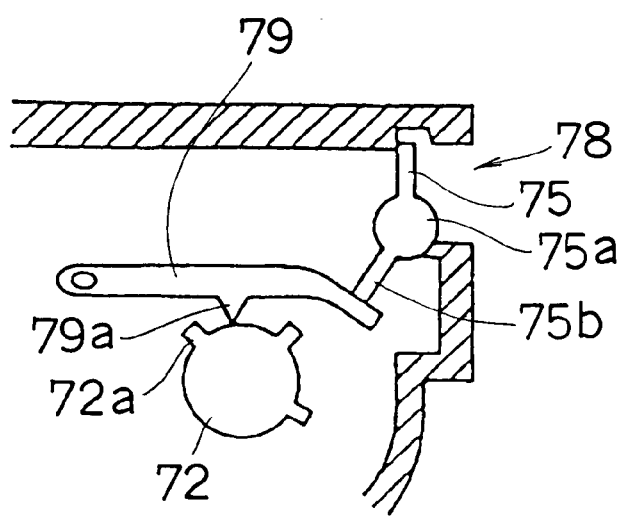
FIGS. 17A to 17C are views of assistance in explaining operations of a cartridge spool.

In order that the use condition of the film cartridge 2 can be confirmed with the display windows D1 to D3, the cartridge spool 72 is locked so as not to rotate when the cartridge door 75 is closed. Locking and unlocking operations of the cartridge spool 72 will be described with reference to FIGS. 17A to 17C. As shown in FIG. 17A, a protrusion 72a is provided at an end of the cartridge spool 72, and a spool lock lever 79 having a protrusion 79a engageable with the protrusion 72a is provided so as to be rotatable.

When the cartridge door 75 is closed, the cartridge spool 72 is locked by an engagement portion 75b of the cartridge door 75 abutting an end of the spool lock lever 79 and by the protrusion 79a of the spool lock lever 79 being engaged with the protrusion 72a of the cartridge spool 72, so that the cartridge spool 72 cannot be rotated.

Figure 17B:
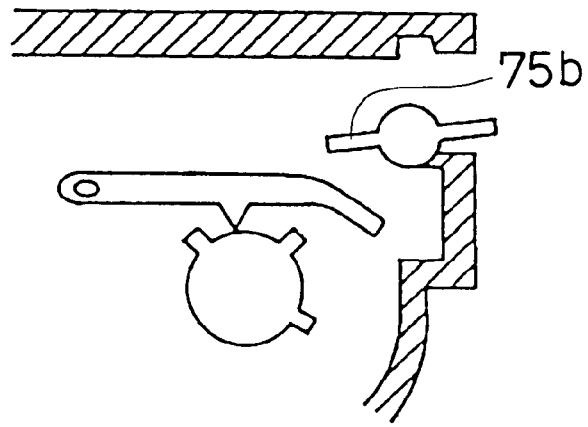
Figure 17C:
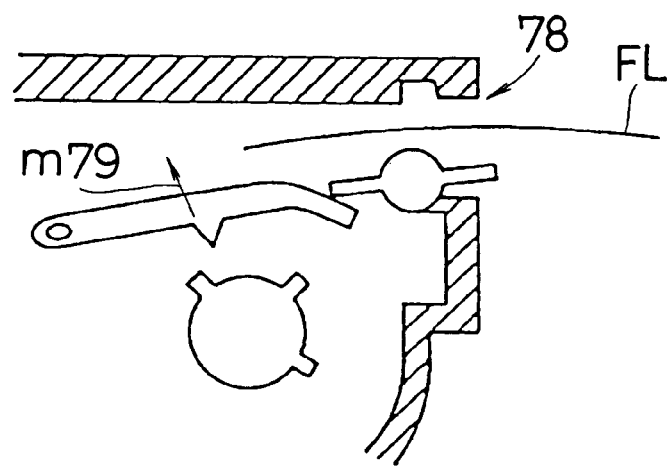
Figure 18:
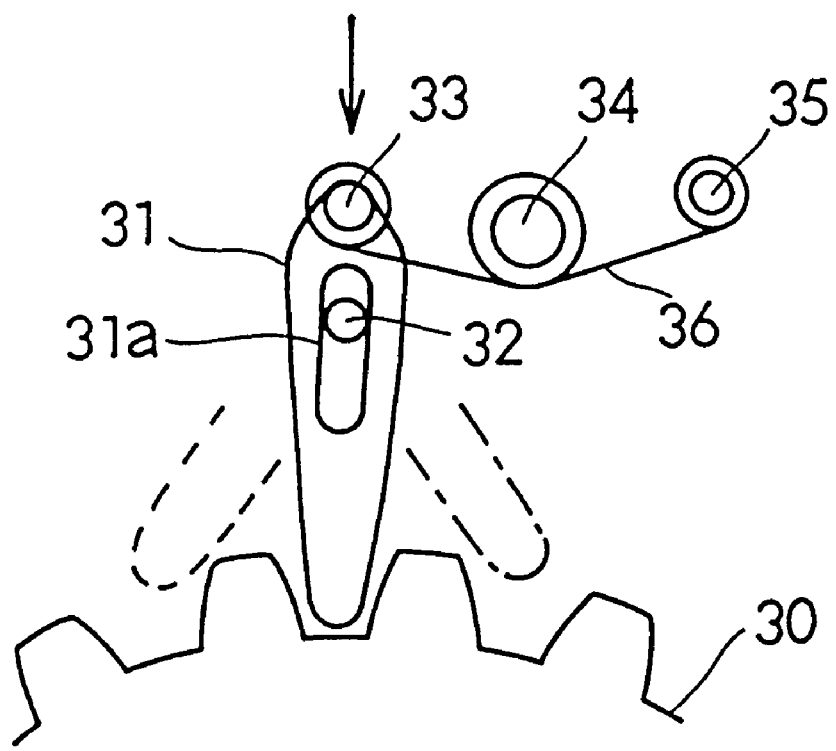
FIG. 18 is a view showing the conventional structure in which the lever is engaged with the fork gear.

As shown in FIG. 17B, when the cartridge door 75 is opened, the engagement portion 75b is moved away from the end of the spool lock lever 79, so that the cartridge spool 72 is unlocked. The spool lock lever 79 is held in the state of FIG. 17B by a non-illustrated click mechanism. When the cartridge spool 72 is rotated under this state, as shown in FIG. 17C, the cartridge spool 72 pushes the spool lock lever 79 against the click in the direction of an arrow m79. Consequently, the film FL is sent out through the film exit 78.

However, as mentioned in the description of the prior art, since the cartridge spool 72 is not engaged from when the cartridge spool 72 is stopped at a predetermined rotation stop position after the film is rewound to when the cartridge door 25 is closed, there is a possibility that the cartridge spool 72 is rotated. When this happens, an erroneous indication is provided such that a film which is exposed only partway is regarded as exposed to the end. A mechanism of the present invention for preventing reversal of rotation of the cartridge spool will be described hereinafter.

Figure 2:
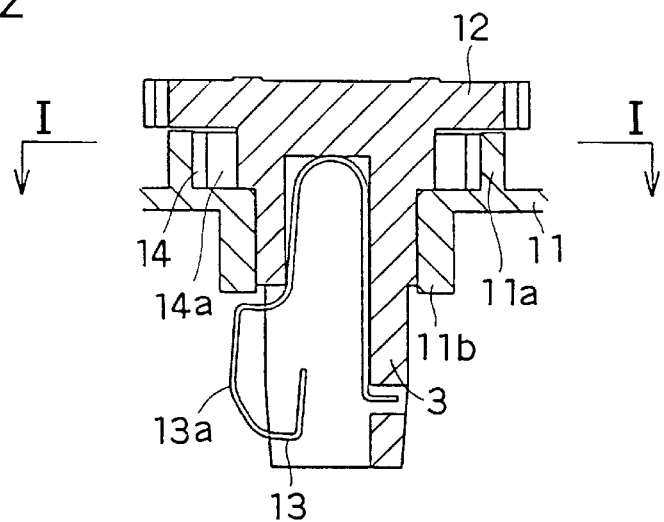
FIG. 2 is a view showing the structure of an embodiment of the present invention.

FIG. 2 is a view showing the structure of an embodiment of the present invention and is a cross-sectional view showing the fork 3 and elements therearound. In the figure, reference numeral 11 represents a body or base plate on the side of the drive switching unit 4, and reference numeral 12 represents a fork gear coaxially provided on an upper portion of the fork 3 and receiving a rotation drive force from the motor 5 of FIG. 1. In the fork 3, a fork key 13 formed by bending a wire into a key shape is provided, and a key portion 13a thereof outwardly protrudes from the periphery of the fork 3. By this portion being engaged with a non-illustrated cartridge spool, rotation of the fork 3 is transmitted to the cartridge spool.

On the lower surface of the body or base plate 11, a bearing portion 11b is provided. The fork 3 is rotatably engaged with the bearing portion 11b and the lower surface of a step portion abuts the portion 11b so that the fork 3 is positioned in the axial direction. On the upper surface of the body or base plate 11, a ring-shaped housing 11a is provided coaxially with the fork 3, and to the inner wall thereof, a resilient member 14 which is also ring-shaped and made of rubber and the like is fixed. A plurality of protrusions 14a inwardly extending from the inner radius of the resilient member 14 abut the periphery of the step portion to thereby rotatively slide the fork 3.

Figure 3A:
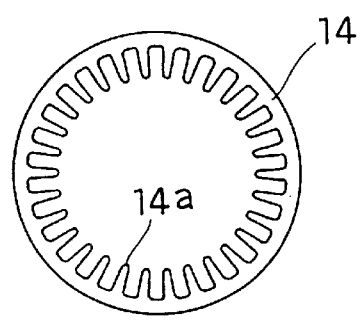
FIGS. 3A and 3B are schematic views of assistance in explaining working of a resilient member in the structure.
Figure 3B:
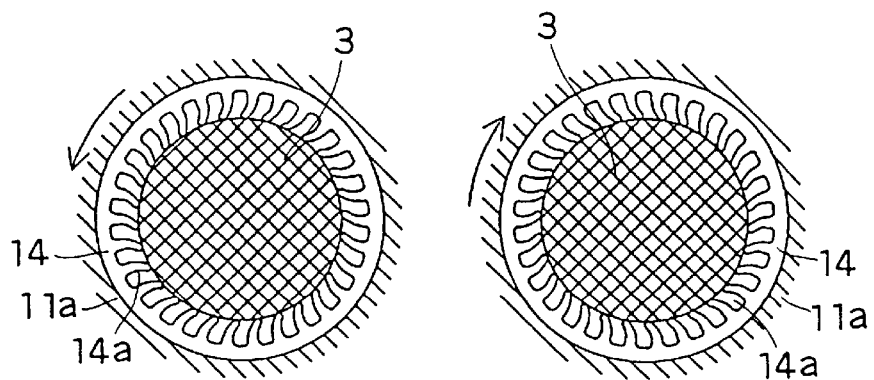

FIGS. 3A and 3B are schematic views of assistance in explaining working of the resilient member 14. FIG. 3A is a structural view of the resilient member 14. The left and right views of FIG. 3B show an A—A cross section of FIG. 2 to show operation condition. As shown in FIG. 3A, in the ring-shaped resilient member 14, a multiplicity of protrusions 14a inwardly extending from the inner radius are arranged substantially isometrically about the center.

As shown in the left view of FIG. 3B, when the fork 3 is rotating leftward as shown by the arrow, the protrusions 14a extending from the resilient member 14 fixed to the inner wall of the housing 11a are bent in the rotation direction of the fork 3, so that the load imposed on the fork 3 as a frictional force by the protrusions 14a is light. As shown in the right view of FIG. 3B, when the rotation direction of the fork 3 is reversed from the leftward direction to the rightward direction shown by the arrow, the direction of the protrusions 14a is also reversed, so that the protrusions 14a are compressed at this time to increase the frictional force at the sliding position and a load is imposed. As a result, reversal of rotation of the cartridge spool is prevented.

When the fork 3 continues rotating rightward, the protrusions 14a are completely bent in the rotation direction of the fork 3, so that the load imposed on the fork 3 as a frictional force by the protrusions 14a again becomes light. By the above-described working, erroneous rotation of the cartridge spool is prevented and the load imposed when the film is transported is reduced. This applies to the case in which the rotation direction is opposite.

Figure 4:
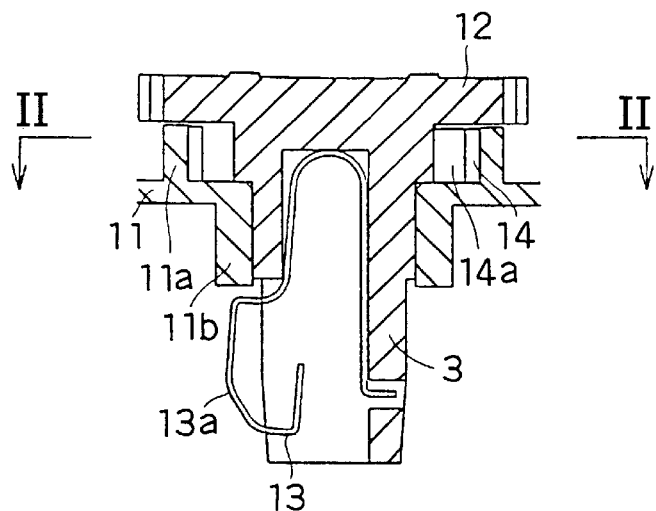
FIG. 4 is a view showing the structure of a case in which only one protrusion is provided in the embodiment of the present invention.
Figure 5A:
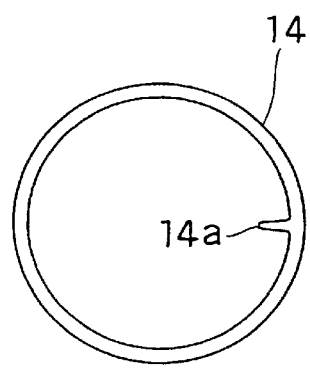
FIGS. 5A and 5B are schematic views of assistance in explaining working of a resilient member in the structure.
Figure 5B:
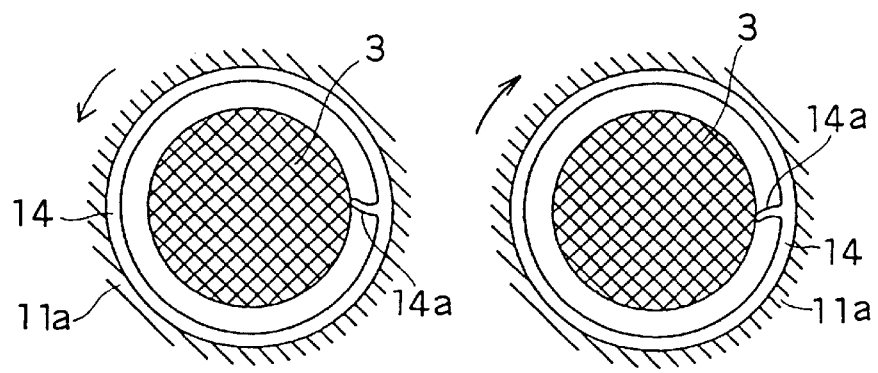

FIG. 4 is a view showing the structure of a case in which only one protrusion 14a is provided in the above-described embodiment of the present invention and is a cross-sectional view showing the fork 3 and elements therearound. The basic structure of this view is the same as that of FIG. 2. FIGS. 5A and 5B are schematic views of assistance in explaining working of the resilient member 14. FIG. 5A is a structural view of the resilient member 14. The left and right views of FIG. 5B show a B—B cross section of FIG. 4 to show operation condition. As shown in FIG. 5A, in the ring-shaped resilient member 14, one protrusion 14a inwardly extending from the inner radius is provided.

As shown in the left view of FIG. 5B, when the fork 3 is rotating leftward as shown by the arrow, the protrusion 14a extending from the resilient member 14 fixed to the inner wall of the housing 11a is bent in the rotation direction of the fork 3, so that the load imposed on the fork 3 as a frictional force by the protrusion 14a is light. As shown in the right view of FIG. 5B, when the rotation direction of the fork 3 is reversed from the leftward direction to the rightward direction shown by the arrow, the direction of the protrusion 14a is also reversed, so that a load is imposed at this time to prevent reversal of rotation of the cartridge spool.

When the fork 3 continues rotating rightward, the protrusion 14a is completely bent in the rotation direction of the fork 3, so that the load imposed on the fork 3 as a frictional force by the protrusion 14a again becomes light. By the above-described working, erroneous rotation of the cartridge spool is prevented and the load imposed when the film is transported is reduced. This applies to the case in which the rotation direction is opposite. The basic structure of this case is the same as that of FIG. 3. By thus changing the number of protrusions, the frictional force can be adjusted.

Figure 6:
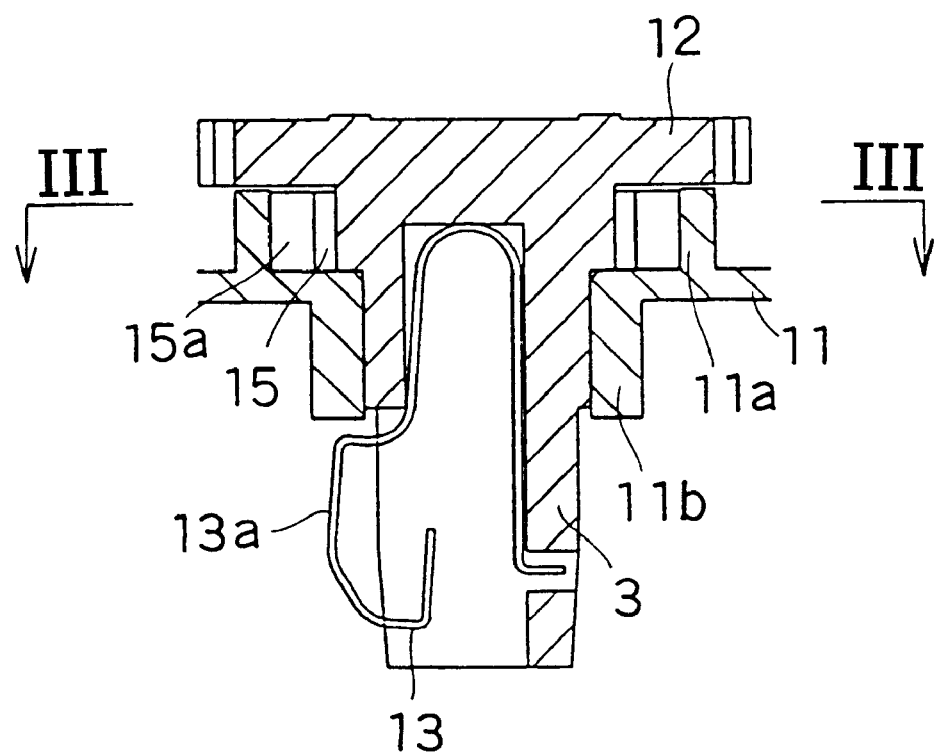
FIG. 6 is a view showing the structure of another embodiment of the present invention.

FIG. 6 is a view showing the structure of another embodiment of the present invention and is a cross-sectional view showing the fork 3 and elements therearound. In the figure, reference numeral 11 represents a body or base plate on the side of the drive switching unit 4, and reference numeral 12 represents a fork gear coaxially provided on an upper portion of the fork 3 and receiving a rotation drive force from the motor 5 of FIG. 1. In the fork 3, a fork key 13 formed by bending a wire into a key shape is provided, and a key portion 13a thereof outwardly protrudes from the periphery of the fork 3. By this portion being engaged with a non-illustrated cartridge spool, rotation of the fork 3 is transmitted to the cartridge spool.

On the lower surface of the body or base plate 11, a bearing portion 11b is provided. The fork 3 is rotatably engaged with the bearing portion 11b and the lower surface of a step portion abuts the portion 11b so that the fork 3 is positioned in the axial direction. On the upper surface of the body or base plate 11, a ring-shaped housing 11a is provided coaxially with the fork 3, and to the periphery of the step portion of the fork 3, a resilient member 15 which is also ring-shaped and made of rubber and the like is fixed. A plurality of protrusions 15a outwardly extending from the periphery of the resilient member 15 abut the inner surface of the housing 11a to thereby rotatively slide the fork 3.

Figure 7A:
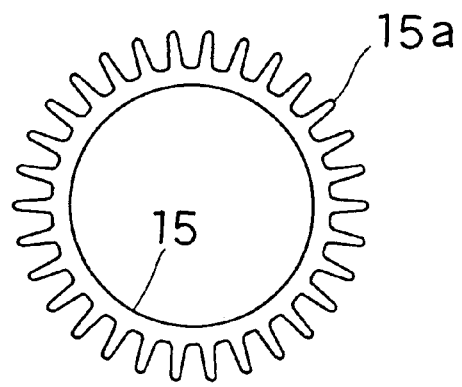
FIGS. 7A and 7B are schematic views of assistance in explaining working of a resilient member in the structure.
Figure 7B:
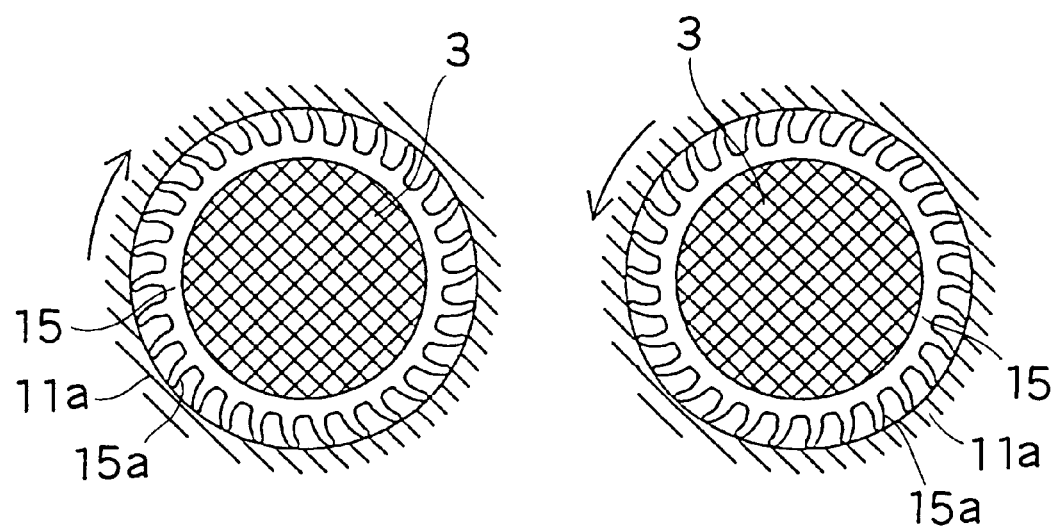

FIGS. 7A and 7B are schematic views of assistance in explaining working of the resilient member 15. FIG. 7A is a structural view of the resilient member 15. The left and right views of FIG. 7B show a C—C cross section of FIG. 6 to show operation condition. As shown in FIG. 7A, on the ring-shaped resilient member 15, a multiplicity of protrusions 15a outwardly extending from the periphery are arranged substantially isometrically about the center.

As shown in the left view of FIG. 7B, when the fork 3 is rotating rightward as shown by the arrow, the protrusions 15a extending from the resilient member 15 fixed to the periphery of the step portion of the fork 3 are bent in a direction in accordance with the rotation of the fork 3, so that the load transmitted to the inner wall of the housing 11a as a frictional force by the protrusions 15a and imposed on the fork 3 as a reaction thereof is light. As shown in the right view of FIG. 7B, when the rotation direction of the fork 3 is reversed from the rightward direction to the leftward direction shown by the arrow, the direction of the protrusions 15a is also reversed, so that a load is imposed at this time to prevent reversal of rotation of the cartridge spool.

When the fork 3 continues rotating leftward, the protrusions 15a are completely bent in accordance with the rotation of the fork 3, so that the load transmitted to the inner wall of the housing 11a as a frictional force by the protrusions 15a and imposed on the fork 3 as a reaction thereof again becomes light. By the above-described working, erroneous rotation of the cartridge spool is prevented and the load imposed when the film is transported is reduced. This applies to the case in which the rotation direction is opposite.

Figure 8:
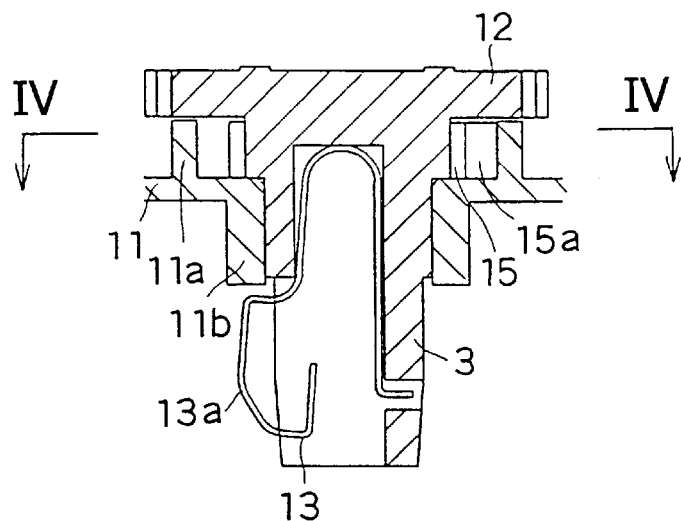
FIG. 8 is a view showing the structure of a case when only one protrusion is provided in another embodiment of the present invention.
Figure 9A:
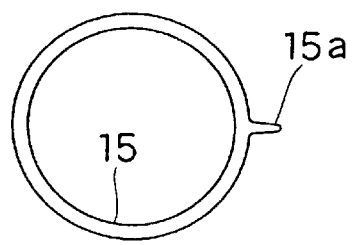
FIGS. 9A and 9B are schematic views of assistance in explaining working of a resilient member in the structure.
Figure 9B:
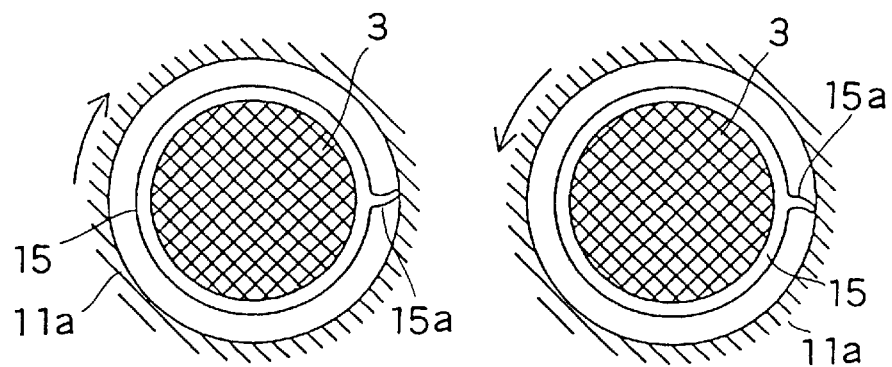

FIG. 8 is a view showing the structure of a case in which only one protrusion 15a is provided in the above-described embodiment of the present invention and is a cross-sectional view showing the fork 3 and elements therearound. The basic structure of this view is the same as that of FIG. 6. FIGS. 9A and 9B are schematic views of assistance in explaining working of the resilient member 15. FIG. 9A is a structural view of the resilient member 15. The left and right views of FIG. 9B show a D—D cross section of FIG. 8 to show operation condition. As shown in FIG. 9A, on the ring-shaped resilient member 15, one protrusion 15a outwardly extending from the periphery is provided.

As shown in the left view of FIG. 9B, when the fork 3 is rotating rightward as shown by the arrow, the protrusion 15a extending from the resilient member 15 fixed to the periphery of the step portion of the fork 3 is bent in a direction in accordance with the rotation of the fork 3, so that the load transmitted to the inner wall of the housing 11a as a frictional force by the protrusion 15a and imposed on the fork 3 as a reaction thereof is light. As shown in the right view of FIG. 9B, when the rotation direction of the fork 3 is reversed from the rightward direction to the leftward direction shown by the arrow, the direction of the protrusion 15a is also reversed, so that a load is imposed at this time to prevent reversal of rotation of the cartridge spool.

When the fork 3 continues rotating leftward, the protrusion 15a is completely bent in accordance with the rotation of the fork 3, so that the load transmitted to the inner wall of the housing 11a as a frictional force by the protrusion 15a and imposed on the fork 3 as a reaction thereof again becomes light. By the above-described working, erroneous rotation of the cartridge spool is prevented and the load imposed when the film is transported is reduced. This applies to the case in which the rotation direction is opposite. The basic structure of this case is the same as that of FIG. 7. By thus changing the number of protrusions, the frictional force can be adjusted.

Figure 10A:
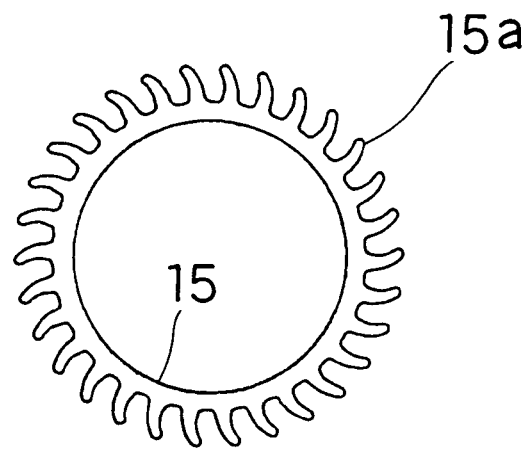
FIGS. 10A and 10B are views of assistance in explaining a case in which the load is changed according to the rotation direction.
Figure 10B:
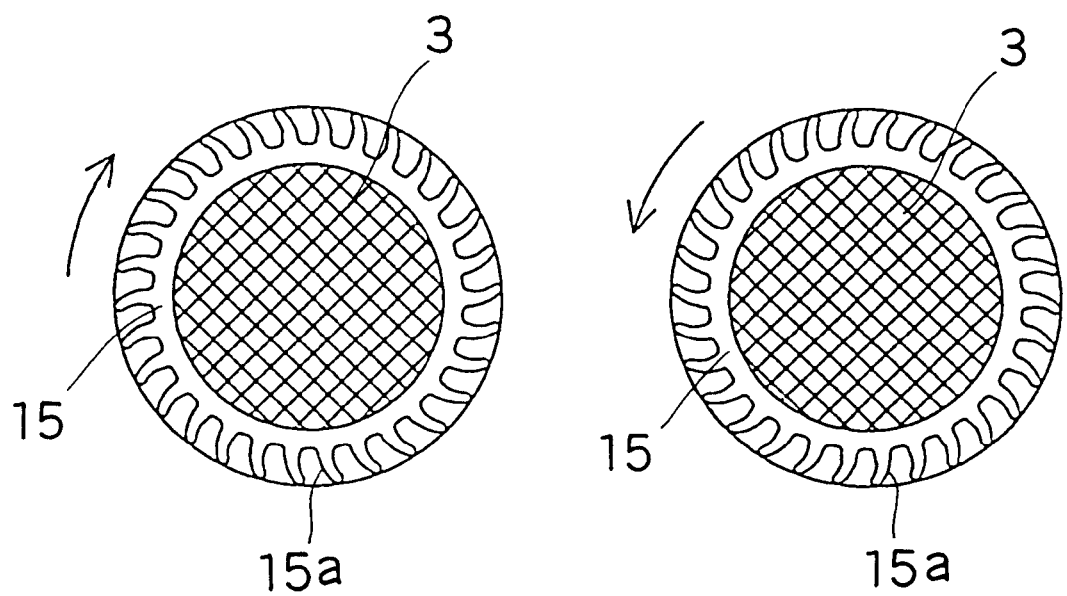

FIGS. 10A and 10B are schematic views of assistance in explaining working of the resilient member 15 of a case in which the load is changed according to the rotation direction. FIG. 10A is a structural view of the resilient member 15. The left and right views of FIG. 10B show a C—C cross section of FIG. 6 to show operation condition. In this case, as shown in FIG. 10A, on the ring-shaped resilient member 15, a multiplicity of protrusions 15a outwardly extending from the periphery are arranged substantially isometrically about the center. The ends of the protrusions 15a are bent in a predetermined rotation direction.

At this time, as shown in the left view of FIG. 10B, when the fork 3 is rotating rightward as shown by the arrow, the protrusions 15a extending from the resilient member 15 fixed to the periphery of the step portion of the fork 3 are previously bent in a direction in accordance with the rotation of the fork 3, so that the load transmitted to the inner surface of the housing 11a as a frictional force by the protrusions 15a and imposed on the fork 3 as a reaction thereof becomes lighter than the case of the above-described another embodiment.

As shown in the right view of FIG. 10B, when the rotation direction of the fork 3 is reversed from the rightward direction to the leftward direction shown by the arrow, the direction of the protrusions 15a is reversed against the direction in which the protrusions 15a are previously bent, so that a heavy load is imposed at this time to effectively prevent reversal of rotation of the cartridge spool. When the fork 3 continues rotating leftward, the protrusions 15a are completely bent in accordance with the rotation of the fork 3, so that the load transmitted to the inner wall of the housing 11a as a frictional force by the protrusions 15a and imposed on the fork 3 as a reaction thereof again becomes light. However, since the direction of the protrusions 15a is reversed against the direction in which the protrusions 15a are previously bent, the frictional force increases accordingly.

Conversely, when the rotation direction of the fork 3 is reversed from the leftward direction to the rightward direction, the direction of the protrusions 15a is reversed in the direction in which the protrusions 15a are previously bent, so that the load imposed at this time is comparatively light. Thus, the load may be changed between when the rotation direction of the fork 3 is reversed and when the fork 3 is rotatively slid according to the rotation direction so that the load can be adjusted according to the use. This structure can be realized in all of the above-described embodiments. The resilient members described above are not necessarily ring-shaped but may have any configuration that can be fixed to the housing or the fork and where necessary protrusions can be provided.

The structures of the ring-shaped resilient members (14, 15) are not limited to the above-described structures but the resilient member may protrude directly from the fork or the housing to abut the housing or the fork and slide thereover.

Figure 11:
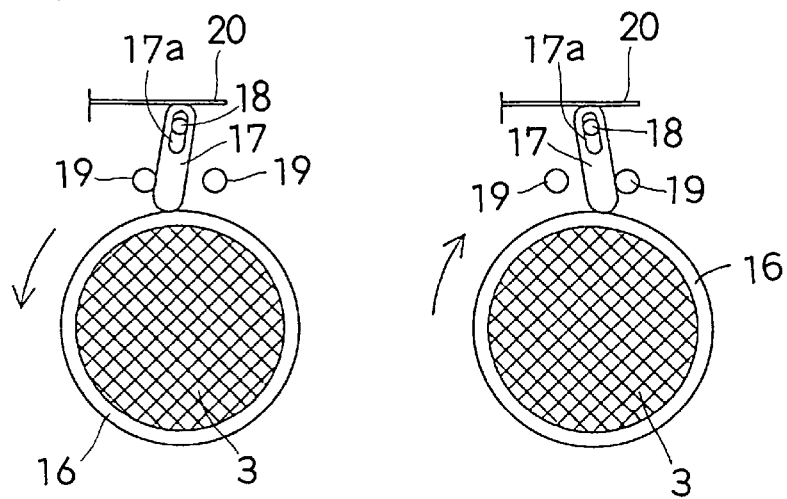
FIG. 11 is a schematic view showing an embodiment in which a lever is used instead of the protrusions.

FIG. 11 is a schematic view showing an embodiment in which a lever is used instead of the protrusions. In the figure, the left and right views show operation conditions when the fork rotates leftward and rightward, respectively. As shown in the figure, the lower end of a longitudinally elongated lever 17 abuts a frictional member 16 provided on the periphery of the fork 3, and an elongate hole 17a is provided at the lever 17 along the length so as to be rotatably and slidably engaged with a support shaft 18 provided on the camera body side.

The lever 17 is pushed toward the fork 3 by a plate spring 20 provided on the camera body side, and is pressed against a frictional member 16. On each of the lower left and right sides of the lever 17, a pin-shaped stopper 19 is provided on the body side to limit the swing of the lever 17 to a predetermined range. At this time, as shown in the left view of the figure, when the fork 3 is rotating leftward as shown by the arrow, the lever 17 is swung in the rotation direction of the fork 3, so that the load imposed on the fork 3 as a frictional force by the lever 17 through the frictional member 16 is light.

As shown in the right view of the figure, when the rotation direction of the fork 3 is reversed from the leftward direction to the rightward direction shown by the arrow, the direction in which the lever 17 is swung is also reversed, so that a load is imposed at this time by the plate spring 20 being pushed back by the lever 17, thereby preventing reversal of rotation of the cartridge spool. When the fork 3 continues rotating rightward, the lever 17 is completely swung in the rotation direction of the fork 3, so that the load imposed on the fork 3 as a frictional force by the lever 17 through the frictional member 16 again becomes light.

By the above-described working, erroneous rotation of the cartridge spool is prevented and the load imposed when the film is transported is reduced. This applies to the case in which the rotation direction is opposite. The fork 3 and the frictional member 16 may be integrally formed. Moreover, instead of using the frictional member 16, the friction coefficient may be increased by increasing the surface roughness of the periphery of the fork 3.

Figure 12:
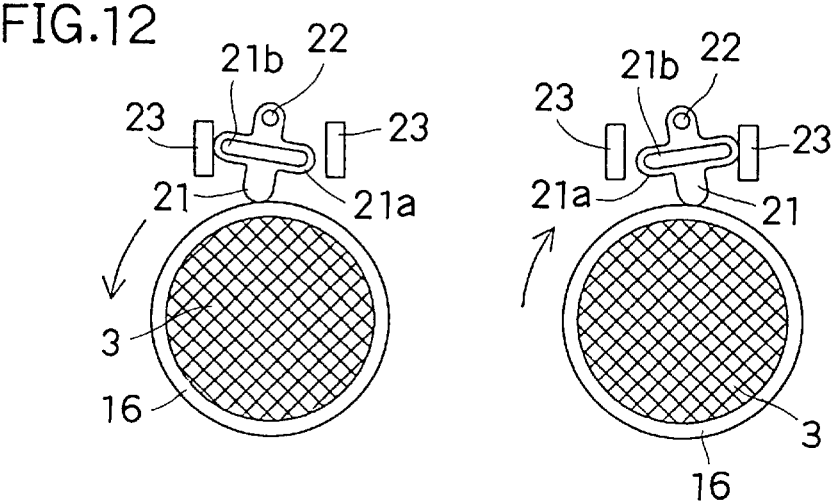
FIG. 12 is a schematic view showing an embodiment in which the lever has resilience.

FIG. 12 is a schematic view showing an embodiment in which instead of using the plate spring, the lever is provided with resilience. In the figure, the left and right views show operation conditions when the fork rotates leftward and rightward, respectively. As shown in the figure, the lower end of a substantially cross-shaped lever 21 abuts the frictional member 16 provided on the periphery of the fork 3, an elongate hole 21b which is a size smaller than the lever 21 is provided at the lever 21 along the left and right arms of the cross shape, and a spring portion 21a is formed at each of the left and right ends of the lever 21. At the upper end of the lever 21, a non-illustrated hole is provided which is rotatably engaged with a rotational shaft 22 provided on the camera body side.

The lever 21 is pushed toward the fork 3 by the spring portion 21a provided on the camera body side and is pressed against the frictional member 16. On each of the lower left and right sides of the lever 21, a rectangular parallelepiped stopper 23 is provided on the body side to limit the swing of the lever 21 to a predetermined range. At this time, as shown in the left view of the figure, when the fork 3 is rotating leftward as shown by the arrow, the lever 21 is swung in the rotation direction of the fork 3, so that the load imposed on the fork 3 as a frictional force by the lever 21 through the frictional member 16 is light.

As shown in the right view of the figure, when the rotation direction of the fork 3 is reversed from the leftward direction to the rightward direction shown by the arrow, the direction in which the lever 21 is swung is also reversed, so that a load is imposed at this time in accordance with the flexure of the spring portion 21a formed at the lever 21, thereby preventing reversal of rotation of the cartridge spool. When the fork 3 continues rotating rightward, the lever 21 is completely swung in the rotation direction of the fork 3, so that the load imposed on the fork 3 as a frictional force by the lever 21 through the frictional member 16 again becomes light.

By the above-described working, erroneous rotation of the cartridge spool is prevented and the load imposed when the film is transported is reduced. This applies to the case in which the rotation direction is opposite. Like the embodiment of FIG. 11, the fork 3 and the frictional member 16 may be integrally formed. Moreover, instead of using the frictional member 16, the friction coefficient may be increased by increasing the surface roughness of the periphery of the fork 3.

Figure 13:
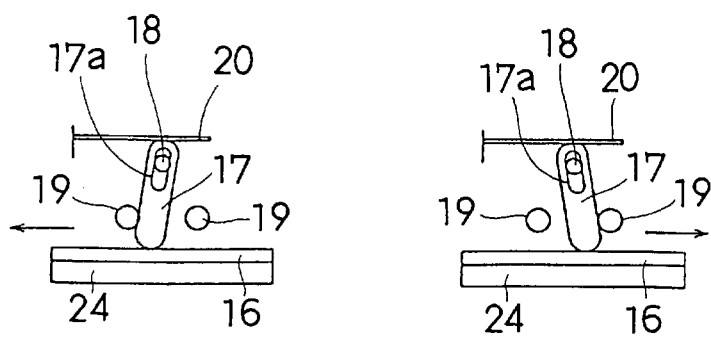
FIG. 13 is a schematic view showing an embodiment in which the mechanism of the lever is applied to a reciprocating motion.

FIG. 13 is a schematic view showing an embodiment in which the mechanism shown in FIG. 11 is applied to a reciprocating motion. In the figure, the left and right views show operation conditions when a sliding member slides leftward and rightward, respectively. As shown in the figure, the lower end of the longitudinally elongated lever 17 abuts the frictional member 16 provided on the surface of a sliding member 24, and the elongate hole 17a is provided at the lever 17 along the length. The elongate hole 17a is rotatably and slidably engaged with the support shaft 18 provided on the apparatus body side.

The lever 17 is pushed toward the sliding member 24 by the plate spring 20 provided on the body side, and is pressed against the resilient member 16. On each of the lower left and right sides of the lever 17, the pin-shaped stopper 19 is provided on the body side to limit the swing of the lever 17 to a predetermined range. At this time, as shown in the left view of the figure, when the sliding member 24 is sliding leftward as shown by the arrow, the lever 17 is swung in the sliding direction of the sliding member 24, so that the load imposed on the sliding member 24 as a frictional force by the lever 17 through the frictional member 16 is light.

As shown in the right view of the figure, when the sliding direction of the sliding member 24 is reversed from the leftward direction to the rightward direction shown by the arrow, the direction in which the lever 17 is swung is also reversed, so that a load is imposed at this time by the plate spring 20 being pushed back by the lever 17, thereby preventing reversal of rotation of the sliding member 24. When the sliding member 24 continues sliding rightward, the lever 17 is completely swung in the sliding direction of the sliding member 24, so that the load imposed on the sliding member 24 as a frictional force by the lever 17 through the frictional member 16 again becomes light.

By the above-described working, the mechanism of the present invention is applicable not only to rotational motion but also to reciprocating motion. This applies to the case in which the sliding direction is opposite. The mechanism described with reference to FIG. 12 may be used. The sliding member 24 and the frictional member 16 may be integrally formed. Moreover, instead of using the frictional member 16, the friction coefficient may be increased by increasing the surface roughness of the periphery of the sliding member 24.

Figures 19A, 19B:
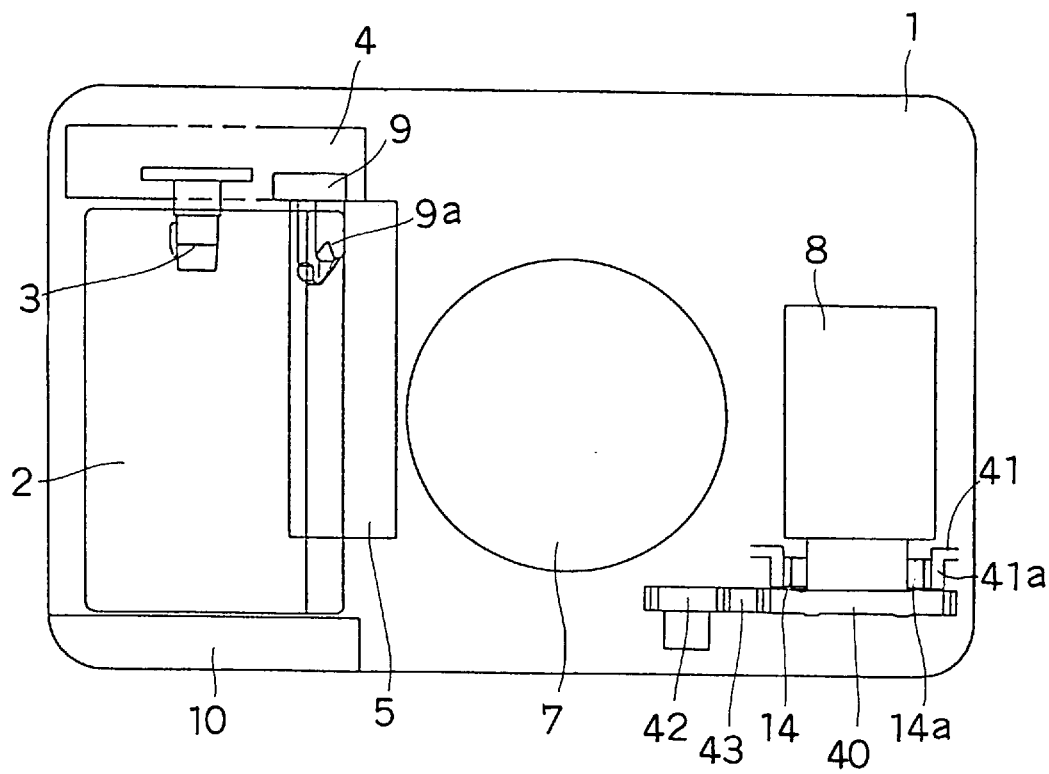
FIGS. 19A and 19B are views schematically showing the disposition of principal parts of a camera in which the present invention is applied to a rewinding spool.

While in the above-described embodiments, the resilient member 14 or 15 is provided between the fork 3 and the camera body in order to prevent reversal of rotation of the cartridge spool, the resilient member may be provided between the rewinding spool 8 for rewinding the film and the camera body. FIGS. 19A and 19B are views showing the structure of an embodiment in which the present invention is applied to the rewinding spool side. FIG. 19A is a front view. FIG. 19B is a bottom view. While the basic structure of FIGS. 19A and 19B is the same as that described with reference to FIG. 1, a mechanism for preventing reversal of rotation is provided on the side of the rewinding spool 8 as mentioned above in this embodiment.

In FIGS. 19A and 19B, reference numeral 40 represents a spool gear coaxially provided below the rewinding spool 8, reference numeral 41 represents a base plate on the camera body side, and reference numerals 42 and 43 represent a sun gear and a planet gear provided adjacently to the spool gear 40, respectively. A rotation drive force is supplied from the sun gear 42 through the planet gear 43 to the spool gear 40. As shown in FIG. 19A, at the bottom surface of the base plate 41, a ring-shaped housing 41a is provided coaxially with the rewinding spool 8, and the above-described resilient member 14 is fixed to the inner surface of the housing 41a. A plurality of protrusions 14a inwardly extending from the inner radius abut the periphery of a lower portion of the rewinding spool 8 to thereby rotatively slide the rewinding spool 8.

When a non-illustrated film is rewound by the rewinding spool 8, as shown in FIG. 19B, the sun gear 42 rotates to mesh the planet gear 43 with the spool gear 40, so that the rotation drive force is transmitted. However, since the planet gear 43 is disengaged from the spool gear 40 as shown by the broken line of the figure after the film is rewound, when the rewinding spool 8 does not have any mechanism for preventing reversal of rotation, the spool 8 rotates in the opposite direction due to back tension of the film. This causes the film to slack, so that there is a possibility that the positions of the film and the frame of the camera disaccord with each other.

According to the above-described structure comprising the resilient member 14, etc., even if the back tension of the film is applied under a condition where the planet gear 43 is disengaged from the spool gear 40 after the rewinding, since the rotation of the rewinding spool 8 in the opposite direction is restrained, the position of the film is not shifted, so that the taken image can be recorded in a predetermined position of the film. The working of the resilient member 14 is the same as that described with reference to FIG. 3. This object can be achieved not only by this structure but also by the structures described with reference to FIGS. 5, 7 and 9 to 12.

Figure 14A:
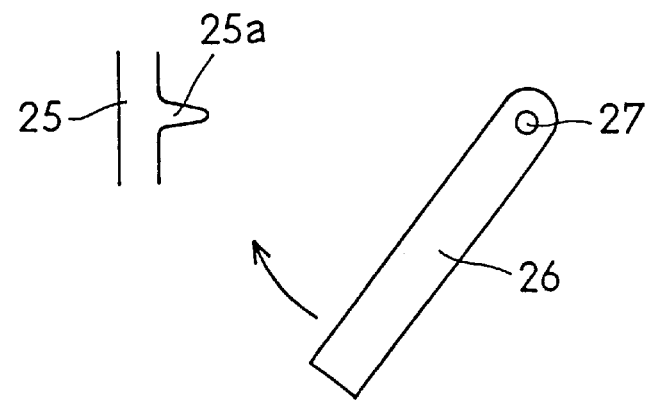
FIGS. 14A and 14B are schematic views showing an embodiment in which the present invention is applied to a movable mirror.
Figure 14B:
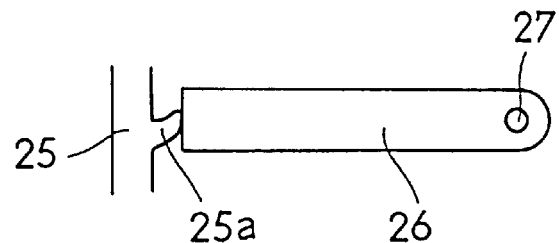

When the structure of the present invention is used for a two-position operation member, the operation member can be used as a snap-action operation member since a heavy load is imposed at the beginning of the reversal. For example, when positioning of a movable mirror of a single-lens reflex camera is performed, the mirror can be prevented from bounding at the time of mirror up by an arrangement such that when a movable mirror 26 situated at the finder use position as shown in FIG. 14A is driven about a rotational shaft 27 in the direction of the arrow by a non-illustrated spring and is risen to a photographing position as shown in FIG. 14B, the end of the mirror 26 is held by a protrusion 25a provided on the surface of the resilient member 25.

While the mechanism for preventing reversal of rotation can be formed of the above-described structures, the present invention is not limited to the structures shown here but it is needless to say that various changes and modifications are possible. For example, for a moving member which makes a linear reciprocating motion, if a fixed member situated with a predetermined space relative to the surface of the moving member is provided, the mechanism for preventing reversal of rotation of the present invention can be formed by providing the above-described resilient member between the moving member and the fixed member. In short, one point is that in a mechanism which makes a motion in the normal and reverse directions, the load is light at the time of normal rotation and increases at the time of reverse rotation and switching therebetween is smoothly performed.

As described above, according to the present invention, a mechanism for preventing reversal of rotation is provided in which with a simple structure, erroneous rotation of the cartridge spool, for example, is prevented and the load imposed when the film is transported is light.

Obviously, many modifications and variations of the present invention are possible in light of the above teachings. It is therefore to be understood that within the scope of the appended claims, the invention may be practiced other than as specifically described.

What is claimed is:

1. A mechanism for preventing reversal of rotation which is used for a camera performing photographing by loading in a cartridge chamber a film cartridge having a cartridge spool and a film wound around said cartridge spool, said mechanism preventing reversal of rotation of said cartridge spool, wherein the following are provided: a fork engaged with said cartridge spool in said cartridge chamber; and a resilient member fixed to a body side of said camera around said fork and having a protrusion inwardly extending to abut a periphery of said fork, and wherein said protrusion slides while being bent along rotation of said fork in one direction and when the rotation direction of said fork is reversed to another direction, the direction of bend of said protrusion is also reversed to thereby impose a load at the time of reversal of rotation on said fork.

2. A mechanism for preventing reversal of rotation as claimed in claim 1, wherein an end of said protrusion is previously bent along the rotation of said fork in one direction so that a load imposed when the rotation direction of said fork is reversed from one direction to another direction is heavier than a load imposed when the rotation direction of said fork is reversed from another direction to one direction.

3. A mechanism for preventing reversal of rotation which is used for a camera performing photographing by loading in a cartridge chamber a film cartridge having a cartridge spool and a film wound around said cartridge spool, said mechanism preventing reversal of rotation of said cartridge spool, wherein the following are provided: a fork engaged with said cartridge spool in said cartridge chamber; and a resilient member fixed to said fork and having a protrusion outwardly extending to abut a housing provided on a body side of said camera around said fork, and wherein said protrusion slides while being bent along rotation of said fork in one direction and when the rotation direction of said fork is reversed to the other direction, the direction of bend of said protrusion is also reversed to thereby impose a load at the time of reversal of rotation on said fork.

4. A mechanism for preventing reversal of rotation as claimed in claim 3, wherein an end of said protrusion is previously bent along the rotation of said fork in one direction so that a load imposed when the rotation direction of said fork is reversed from one direction to another direction is heavier than a load imposed when the rotation direction of said fork is reversed from another direction to one direction.

5. A mechanism for preventing reversal of rotation which is used for a camera performing photographing by loading in a cartridge chamber a film cartridge having a cartridge spool and a film wound around said cartridge spool, said mechanism preventing reversal of rotation of said cartridge spool, wherein the following are provided: a fork engaged with said cartridge spool in said cartridge chamber; and a lever inwardly spring-pushed from around said fork to abut a periphery of said fork, and wherein said lever slides while being inclined along rotation of said fork in one direction and when the rotation direction of said fork is reversed to another direction, the direction of inclination of said lever is also reversed to thereby impose a load at the time of reversal of rotation on said fork.

6. A mechanism for preventing reversal of rotation, comprising: a rotating member which is rotatable in both directions; and a resilient member disposed adjacent to said rotating member and having a protrusion which is frictionally in contact with a peripheral surface of said rotating member, wherein said protrusion slides while being bent along rotation of said rotating member in one direction and when the rotation direction of said rotating member is reversed to another direction, the direction of bend of said protrusion is also reversed to thereby impose a load at the time of reversal of rotation on said rotating member.

7. A mechanism for preventing reversal of rotation which is used for a camera having a spool for rewinding a film sent out of a film cartridge loaded in a cartridge chamber, wherein a resilient member is provided fixed to a body of said camera around said spool and having a protrusion which is frictionally in contact with said spool, and wherein said protrusion slides while being bent along rotation of said spool in one direction and when the rotation direction of said spool is reversed to another direction, the direction of bend of said protrusion is also reversed to thereby impose a load at the time of reversal of rotation on said spool.

8. A mechanism for preventing reversal of rotation, comprising:

a moving member;

a supporting member for supporting said moving member so as to be movable in both normal and reverse directions;

a fixed portion being fixed in a position with a predetermined distance away from said moving member; and a resilient member with a total length longer than the predetermined distance between said moving member and said fixed portion, said resilient member being disposed in a bent state between said moving member and said fixed portion.

9. A mechanism for preventing reversal of rotation as claimed in claim 8, wherein said moving member is a rotating member having a rotational axis, and said resilient member comprises a base fixed to said fixed portion and a protrusion which extends from said base toward said rotational axis and whose end is bent by being in contact with a peripheral surface of said rotational shaft, a direction of bend of said protrusion being changed when a rotation direction of said rotating member is reversed.

10. A mechanism for preventing reversal of rotation as claimed in claim 9, wherein said resilient member has a plurality of protrusions.

11. A mechanism for preventing reversal of rotation as claimed in claim 9, wherein said rotating member is a rotational shaft provided in a driving mechanism for rotating a cartridge spool.

12. A mechanism for preventing reversal of rotation as claimed in claim 8, wherein said moving member is a rotating member having a rotational shaft, and said resilient member comprises a base fixed to a periphery of said rotational shaft and a protrusion which radially extends from the base with the rotational shaft as a center and whose end is bent by being in contact with said fixed portion, a direction of bend of said protrusion being changed when a rotation direction of said rotating member is reversed.

13. A mechanism for preventing reversal of rotation as claimed in claim 12, wherein said resilient member has a plurality of protrusions.

14. A mechanism for preventing reversal of rotation as claimed in claim 12, wherein said rotating member is a rotational shaft provided in a driving mechanism for rotating a cartridge spool.

15. A mechanism for preventing reversal of rotation as claimed in claim 8, wherein said resilient member comprises a base fixed to said fixed portion and a protrusion which extends from said base toward said moving member and whose end is bent by being in contact with said moving member, a direction of bend of said protrusion being changed when a movement direction of said moving member is reversed.

\* \* \* \* \*